US012112704B2

(12) United States Patent
Kim et al.

(10) Patent No.: US 12,112,704 B2
(45) Date of Patent: Oct. 8, 2024

(54) PIXEL CIRCUIT AND DISPLAY DEVICE INCLUDING THE SAME

(71) Applicant: Samsung Display Co., Ltd., Yongin-Si (KR)

(72) Inventors: Yeonkyung Kim, Yongin-si (KR); Kwihyun Kim, Yongin-si (KR); Dongwoo Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/501,031

(22) Filed: Nov. 3, 2023

(65) Prior Publication Data

US 2024/0242671 A1 Jul. 18, 2024

(30) Foreign Application Priority Data

Jan. 12, 2023 (KR) ........................ 10-2023-0004399

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2300/0861* (2013.01); *G09G 2310/08* (2013.01); *G09G 2320/045* (2013.01); *G09G 2330/021* (2013.01)

(58) Field of Classification Search
None
See application file for complete search history.

(56) References Cited

U.S. PATENT DOCUMENTS 7,414,599 B2 8/2008 Chung et al.
2016/0155387 A1* 6/2016 Kim ..................... G09G 3/3291 345/76
2022/0084472 A1* 3/2022 Kim ..................... G09G 3/3266
2024/0119899 A1* 4/2024 Kim ..................... G09G 3/3233

FOREIGN PATENT DOCUMENTS

KR 10-0560780 B1 3/2006

* cited by examiner

*Primary Examiner* — Amare Mengistu
*Assistant Examiner* — Sarvesh J Nadkarni
(74) *Attorney, Agent, or Firm* — Innovation Counsel LLP

(57) ABSTRACT

A pixel circuit is disclosed that includes first through sixth transistors, first and second capacitors, and a light emitting element. A gate electrode of the second transistor receives a first gate signal. A gate electrode of the third transistor receive a second gate signal. Gate electrodes of each of the fourth and fifth transistors receive a third gate signal. A gate electrode of the sixth transistor receives an emission signal. First electrodes of the first transistor and the first capacitor each receive a first power supply voltage. A cathode electrode of the light emitting element receives a second power supply voltage. A first electrode of the fourth transistor receives an initialization voltage.

20 Claims, 9 Drawing Sheets

PIXEL CIRCUIT AND DISPLAY DEVICE INCLUDING THE SAME

This application claims priority under 35 USC § 119 to Korean Patent Application No. 10-2023-0004399 filed on Jan. 12, 2023 in the Korean Intellectual Property Office (KIPO), the entire disclosure of which is incorporated by reference herein.

BACKGROUND

1. Field

Embodiments of the present inventive concept relate to a pixel circuit and a display device including the same.

2. Description of the Related Art

Generally, a display device includes a display panel and a display panel driver. The display panel may include gate lines, data lines, emission lines and pixel circuits. The display panel driver may include a gate driver for providing gate signals to the gate lines, a data driver for providing data voltages to the data lines, an emission driver for providing emission signals to the emission lines, and a driving controller for controlling the gate driver, the data driver, and the emission driver.

In a conventional display device, a pixel circuit may sequentially perform an initialization operation, a threshold voltage compensation operation, a data writing operation, and a light emitting operation. Also, since the number of transistors included in a pixel circuit is relatively large, the conventional display device may have difficulties in terms of integration and power consumption.

SUMMARY

Embodiments of the present inventive concept may provide a pixel circuit including 6 transistors and 2 capacitors.

Embodiments of the present inventive concept may provide a display device including the pixel circuit.

An embodiment of a pixel circuit includes a first transistor including a gate electrode connected to a first node, a first electrode which receives a first power supply voltage, and a second electrode connected to a second node, a second transistor including a gate electrode which receives a first gate signal, a first electrode connected to a data line, and a second electrode connected to a fourth node, a third transistor including a gate electrode which receives a second gate signal, a first electrode connected to the second node, and a second electrode connected to the first node, a fourth transistor including a gate electrode which receives a third gate signal, a first electrode which receives an initialization voltage, and a second electrode connected to the first node, a fifth transistor including a gate electrode which receives the third gate signal, a first electrode connected to the first node, and a second electrode connected to a third node, a sixth transistor including a gate electrode which receives an emission signal, a first electrode connected to the second node, and a second electrode connected to the third node, a first capacitor including a first electrode which receives the first power supply voltage and a second electrode connected to the first node, a second capacitor including a first electrode connected to the fourth node and a second electrode connected to the first node, and a light emitting element including an anode electrode connected to the third node and a cathode electrode which receives a second power supply voltage.

In an embodiment, one frame period in which the pixel circuit is driven may include an initialization period, a threshold voltage compensation period, a data writing period, and a light emission period, during the initialization period, an initialization operation for initializing the fourth node, the first node, and the third node may be performed, during the threshold voltage compensation period, a threshold voltage compensating operation for compensating for a threshold voltage of the first transistor may be performed, during the data writing period, a data writing operation for writing a data voltage to the first node may be performed, and during the light emission period, a light emitting operation for controlling the light emitting element to emit light may be performed.

In an embodiment, during the initialization period, the fourth transistor and the fifth transistor may be turned on in response to the third gate signal such that the initialization voltage is applied to the first node and the third node.

In an embodiment, during the initialization period, a reference voltage may be applied to the data line and the second transistor may be turned on in response to the first gate signal such that the reference voltage is applied to the fourth node.

In an embodiment, during the threshold voltage compensation period, the third transistor may be turned on in response to the second gate signal such that the third transistor diode-connects the first transistor.

In an embodiment, when the first transistor is diode-connected, a voltage of the first node may have a value obtained by adding a threshold voltage of the first transistor to the first power supply voltage.

In an embodiment, during the data writing period, the data voltage may be applied to the data line and the second transistor may be turned on in response to the first gate signal such that the data voltage is applied to the fourth node.

In an embodiment, during the data writing period, the second transistor may be turned on in response to the first gate signal and a voltage of the fourth node may be changed from a reference voltage to the data voltage, such that a voltage of the first node is boosted by a boosting voltage by the first capacitor and the second capacitor.

In an embodiment, the boosting voltage may be determined by using an [Equation] below: $\Delta VN1=\{C\_C2/(C\_C1+C\_C2)\}\times\Delta VN4$ where $\Delta VN1$ denotes the boosting voltage, $C\_C1$ denotes a capacitance of the first capacitor, $C\_C2$ denotes a capacitance of the second capacitor, and $\Delta VN4$ denotes a voltage variation of the fourth node.

In an embodiment, during the light emission period, the sixth transistor may be turned on in response to the emission signal such that the light emitting element emits light based on a driving current of the first transistor.

An embodiment of a display device including the pixel circuit includes a display panel including a pixel circuit and a display panel driver configured to drive the display panel. The pixel circuit includes a first transistor including a gate electrode connected to a first node, a first electrode which receives a first power supply voltage, and a second electrode connected to a second node, a second transistor including a gate electrode which receives a first gate signal, a first electrode connected to a data line, and a second electrode connected to a fourth node, a third transistor including a gate electrode which receives a second gate signal, a first electrode connected to the second node, and a second electrode connected to the first node, a fourth transistor including a gate electrode which receives a third gate signal, a first electrode which receives an initialization voltage, and a second electrode connected to the first node, a fifth transistor including a gate electrode which receives the third gate signal, a first electrode connected to the first node, and a second electrode connected to a third node, a sixth transistor including a gate electrode which receives an emission signal, a first electrode connected to the second node, and a second electrode connected to the third node, a first capacitor including a first electrode which receives the first power supply voltage and a second electrode connected to the first node, a second capacitor including a first electrode connected to the fourth node and a second electrode connected to the first node, and a light emitting element including an anode electrode connected to the third node and a cathode electrode which receives a second power supply voltage.

In an embodiment, one frame period in which the pixel circuit is driven may include an initialization period, a threshold voltage compensation period, a data writing period, and an light emission period, during the initialization period, an initialization operation for initializing the fourth node, the first node, and the third node may be performed, during the threshold voltage compensation period, a threshold voltage compensating operation for compensating a threshold voltage of the first transistor may be performed, during the data writing period, a data writing operation for writing a data voltage to the first node may be performed, and during the light emission period, a light emitting operation for controlling the light emitting element to emit light may be performed.

In an embodiment, during the initialization period, the fourth transistor and the fifth transistor may be turned on in response to the third gate signal such that the initialization voltage is applied to the first node and the third node.

In an embodiment, during the initialization period, a reference voltage may be applied to the data line and the second transistor may be turned on in response to the first gate signal such that the reference voltage is applied to the fourth node.

In an embodiment, during the threshold voltage compensation period, the third transistor may be turned on in response to the second gate signal such that the third transistor diode-connects the first transistor.

In an embodiment, when the first transistor is diode-connected, a voltage of the first node may have a value obtained by adding a threshold voltage of the first transistor to the first power supply voltage.

In an embodiment, during the data writing period, the data voltage may be applied to the data line and the second transistor may be turned on in response to the first gate signal such that the data voltage is applied to the fourth node.

In an embodiment, during the data writing period, the second transistor may be turned on in response to the first gate signal and a voltage of the fourth node may be changed from a reference voltage to the data voltage, such that a voltage of the first node is boosted by a boosting voltage by the first capacitor and the second capacitor.

In an embodiment, the boosting voltage may be determined by using an [Equation] below: $\Delta VN1=\{C\_C2/(C\_C1+C\_C2)\}\times \Delta VN4$, where $\Delta VN1$ denotes the boosting voltage, C_C1 denotes a capacitance of the first capacitor, C_C2 denotes a capacitance of the second capacitor, and $\Delta VN4$ denotes a voltage variation of the fourth node.

In an embodiment, during the light emission period, the sixth transistor may be turned on in response to the emission signal such that the light emitting element emits light based on a driving current of the first transistor.

An embodiment of a pixel circuit and a display device including the pixel circuit may include a first transistor including a gate electrode connected to a first node, a first electrode which receives a first power supply voltage, and a second electrode connected to a second node, a second transistor including a gate electrode which receives a first gate signal, a first electrode connected to a data line, and a second electrode connected to a fourth node, a third transistor including a gate electrode which receives a second gate signal, a first electrode connected to the second node, and a second electrode connected to the first node, a fourth transistor including a gate electrode which receives a third gate signal, a first electrode which receives an initialization voltage, and a second electrode connected to the first node, a fifth transistor including a gate electrode which receives the third gate signal, a first electrode connected to the first node, and a second electrode connected to a third node, a sixth transistor including a gate electrode which receives an emission signal, a first electrode connected to the second node, and a second electrode connected to the third node, a first capacitor including a first electrode which receives the first power supply voltage and a second electrode connected to the first node, a second capacitor including a first electrode connected to the fourth node and a second electrode connected to the first node, and a light emitting element including an anode electrode connected to the third node and a cathode electrode which receives a second power supply voltage. Therefore, the pixel circuit may perform the initialization operation, the threshold voltage compensation operation, the data writing operation, and the light emitting operation while having a simple configuration. In addition, high integration may be possible and power consumption may be reduced.

BRIEF DESCRIPTION OF THE DRAWINGS

The above and other features of embodiments of the present inventive concept will become more apparent by describing in detailed embodiments thereof with reference to the accompanying drawings, in which.

DETAILED DESCRIPTION OF THE EMBODIMENTS

Hereinafter, embodiments of the present inventive concept will be described in detail with reference to the accompanying drawings.

Figure 1:
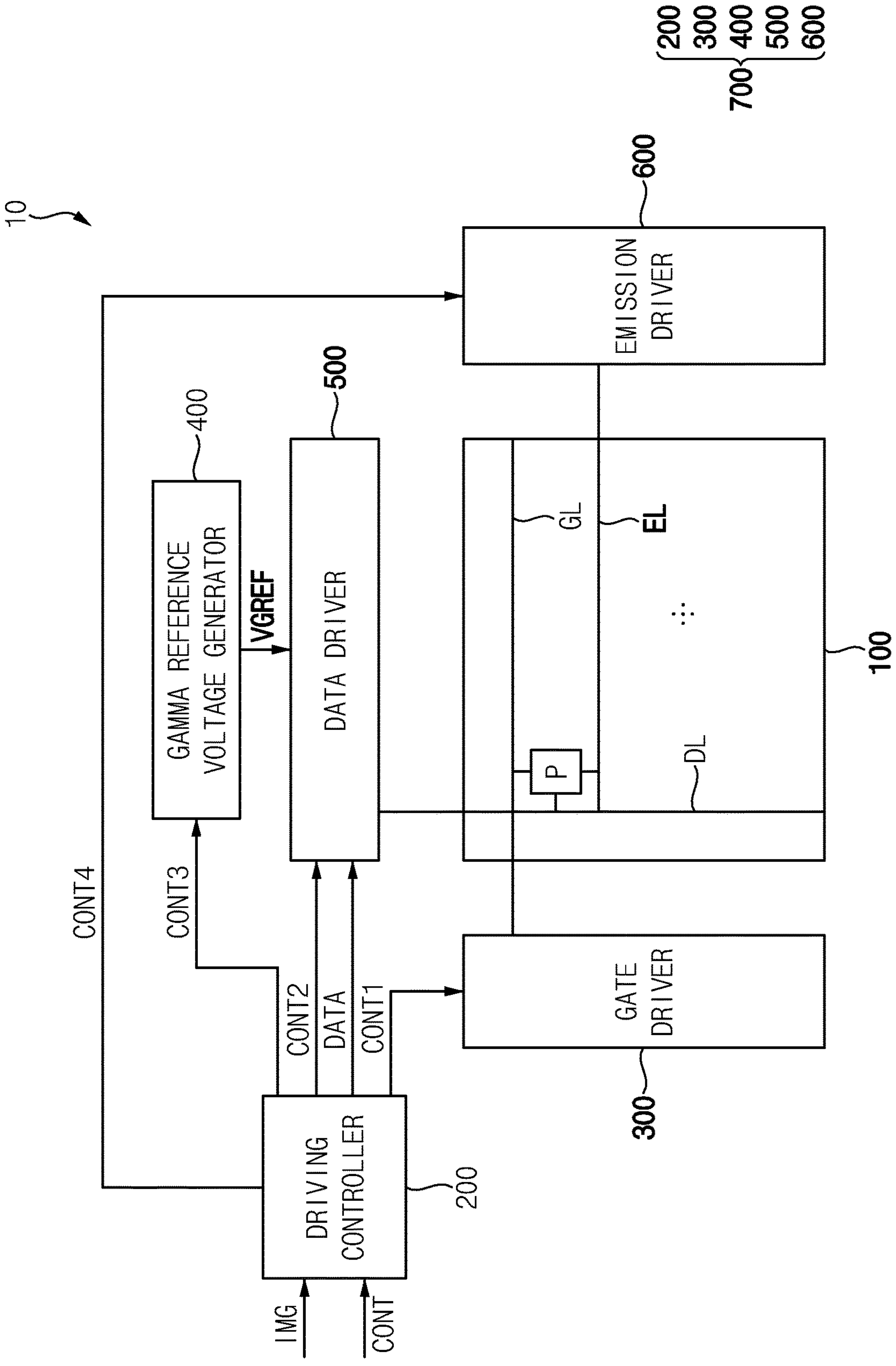
FIG. 1 is a block diagram illustrating a display device according to embodiments of the present inventive concept.

FIG. 1 is a block diagram illustrating a display device 10 according to embodiments of the present inventive concept.

Referring to FIG. 1, a display device 10 may include a display panel 100 and a display panel driver 700. The display panel driver 700 may include a driving controller 200, a gate driver 300, a gamma reference voltage generator 400, a data driver 500, and an emission driver 600.

In an embodiment, the driving controller 200 and the data driver 500 may be integrally formed. In an embodiment, the driving controller 200, the gamma reference voltage generator 400, and the data driver 500 may be integrally formed. In an embodiment, the driving controller 200, the gate driver 300, and the gamma reference voltage generator 400, and the data driver 500 may be integrally formed. In an embodiment, the driving controller 200, the gate driver 300, and the gamma reference voltage generator 400, the data driver 500, and the emission driver may be integrally formed. A driving module including at least the driving controller 200 and the data driver 500 which are integrally formed may be referred to as a timing controller embedded data driver (TED).

The display panel 100 may include a display region displaying an image and a peripheral region disposed adjacent to the display region.

In an embodiment, the display panel 100 may be an organic light emitting diode display panel including organic light emitting diodes. In an embodiment, the display panel 100 may be a quantum-dot organic light emitting diode display panel including organic light emitting diodes and quantum-dot color filters. In an embodiment, the display panel 100 may be a quantum-dot nano light emitting diode display panel including nano light emitting diodes and quantum-dot color filters.

The display panel 100 may include gate lines GL, data lines DL, emission lines EL, and pixel circuits P electrically connected to the gate lines GL, the data lines DL, and the emission lines EL.

The driving controller 200 may receive input image data IMG and an input control signal CONT from an external device. For example, the input image data IMG may include red image data, green image data, and blue image data. The input image data IMG may further include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the emission driver 600 based on the input control signal CONT, and output the fourth control signal CONT4 to the emission driver 600.

The gate driver 300 may generate gate signals for driving the gate lines GL in response to the first control signal CONT1 received from the driving controller 200. The gate driver 300 may output the gate signals to the gate lines GL.

In an embodiment, the gate driver 300 may be integrated on the peripheral region of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

In an embodiment, the gamma reference voltage generator 400 may be disposed in the driving controller 200 or in the data driver 500.

The data driver 500 may receive the second control signal CONT2 and the data signal DATA from the driving controller 200. The data driver 500 may convert the data signal DATA into a data voltage in analog form. The data driver 500 may output the data voltage to the data line DL.

The emission driver may generate emission signals for driving the emission lines EL in response to the fourth control signal CONT4 received from the driving controller 200. The emission driver 600 may output the emission signals to the emission lines EL.

FIG. 1 illustrates that the gate driver 300 is disposed on a first side of the display panel 100 and the emission driver 600 is disposed on a second side of the display panel 100 for convenience of description, but the present inventive concept is not limited to this. For example, both the gate driver 300 and the emission driver 600 may be disposed on the first side of the display panel 100. For example, the gate driver 300 and the emission driver 600 may be integrally formed.

Figure 2:
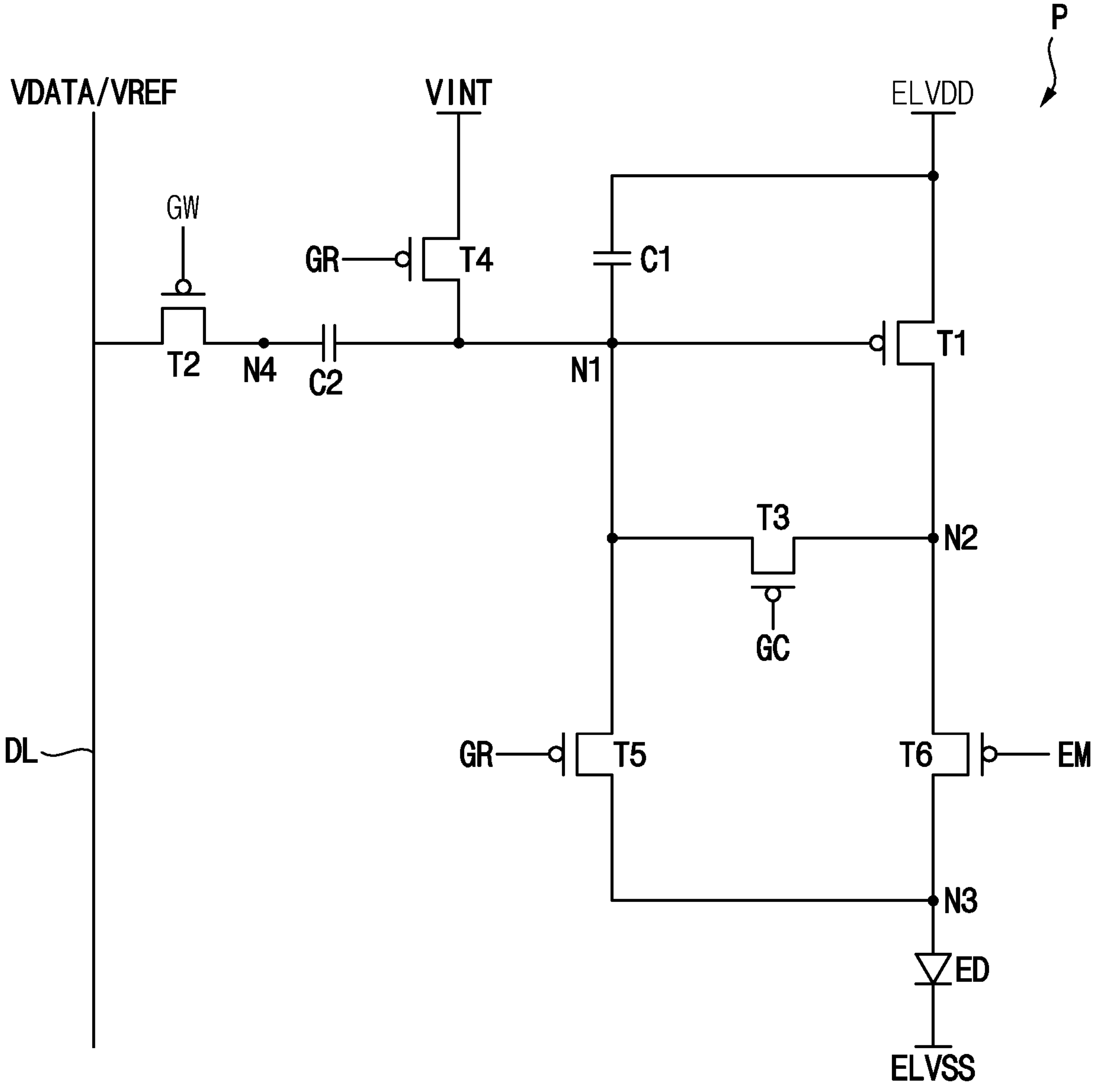
FIG. 2 is a diagram illustrating a pixel circuit included in the display device of FIG. 1.
Figure 3:
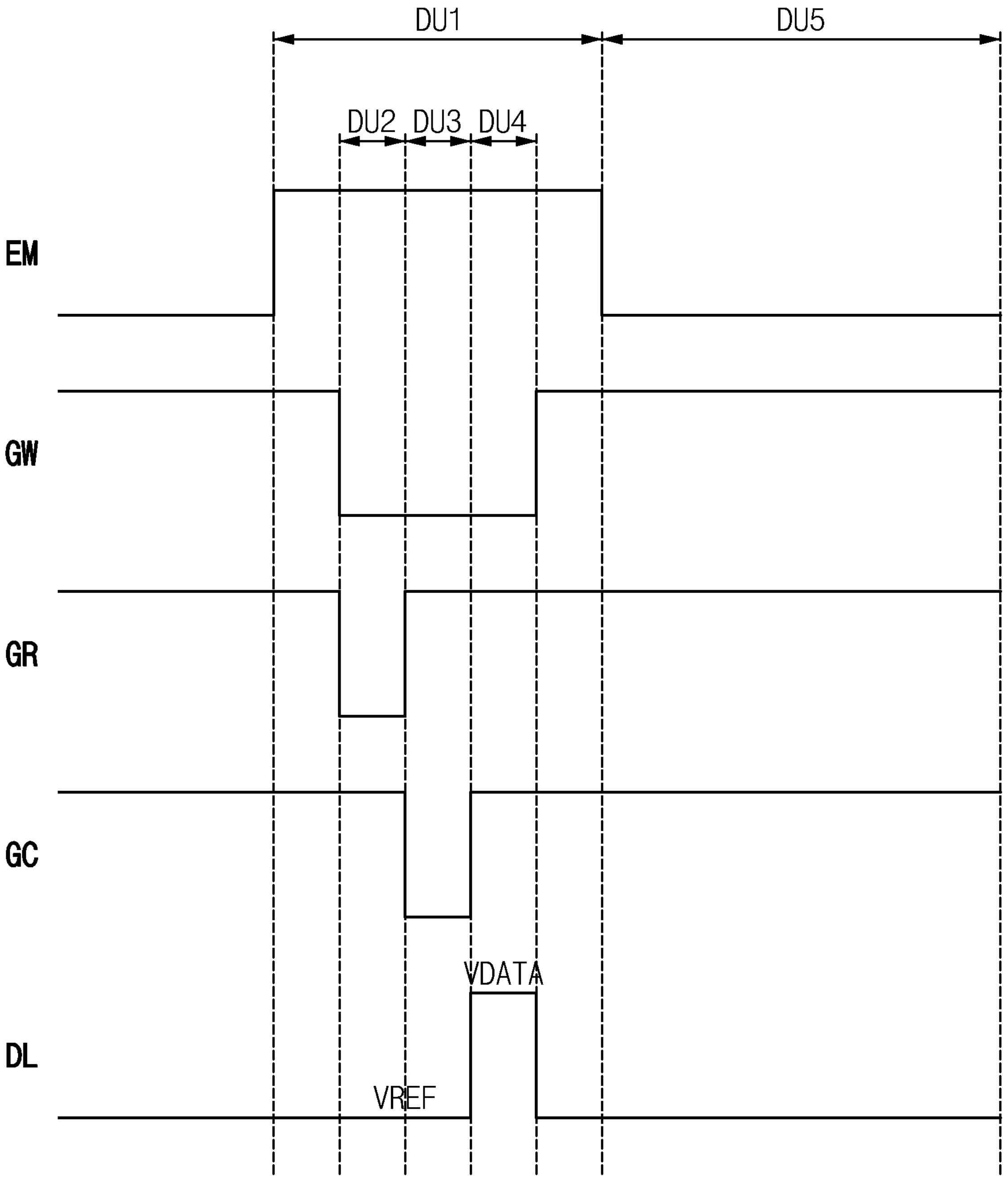
FIG. 3 is a waveform diagram illustrating one frame period in which the pixel circuit of FIG. 2 is driven.
Figure 4:
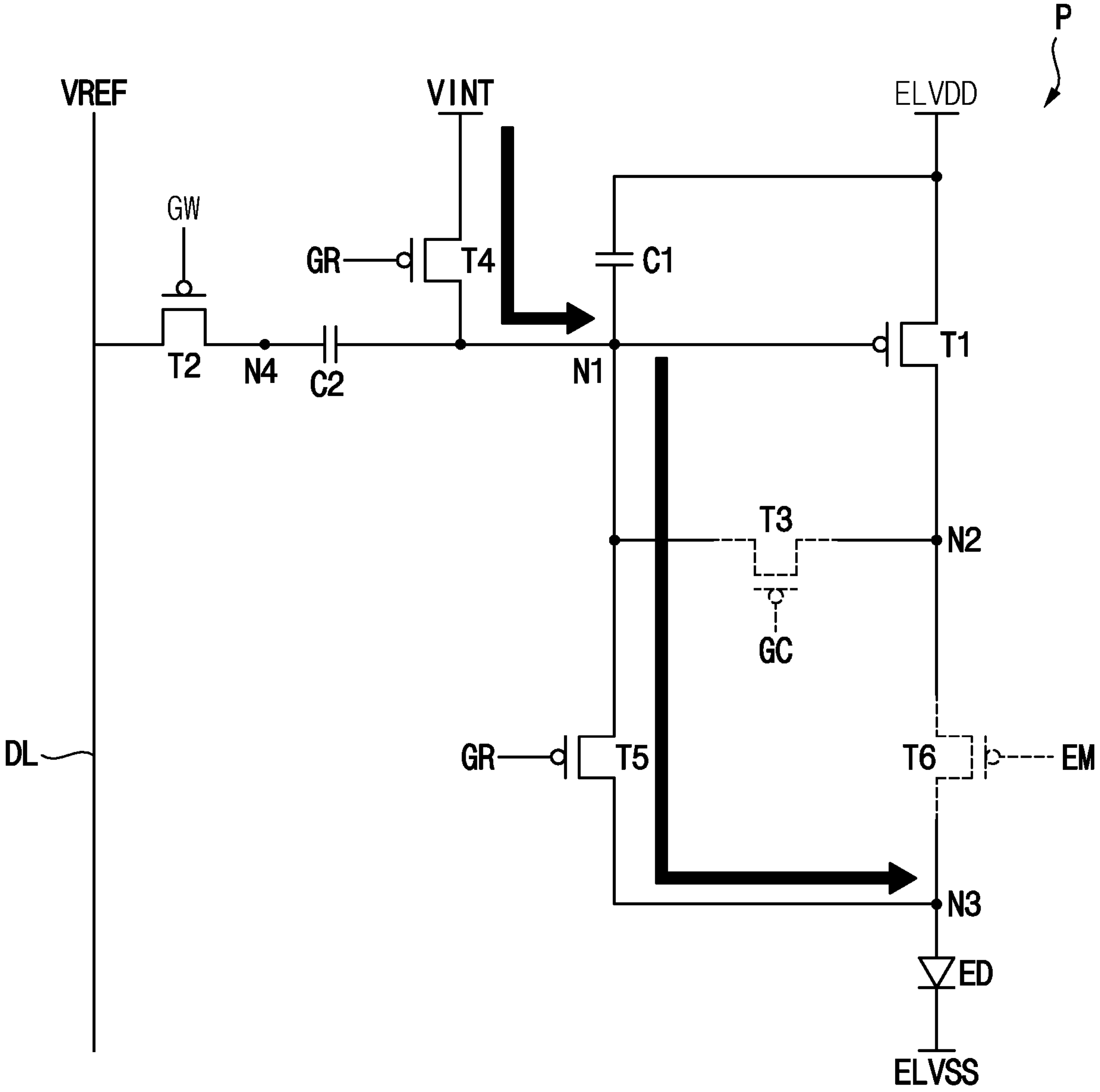
FIG. 4 is a diagram illustrating that the pixel circuit of FIG. 2 performs an initialization operation in an initialization period shown in FIG. 3.
Figure 5:
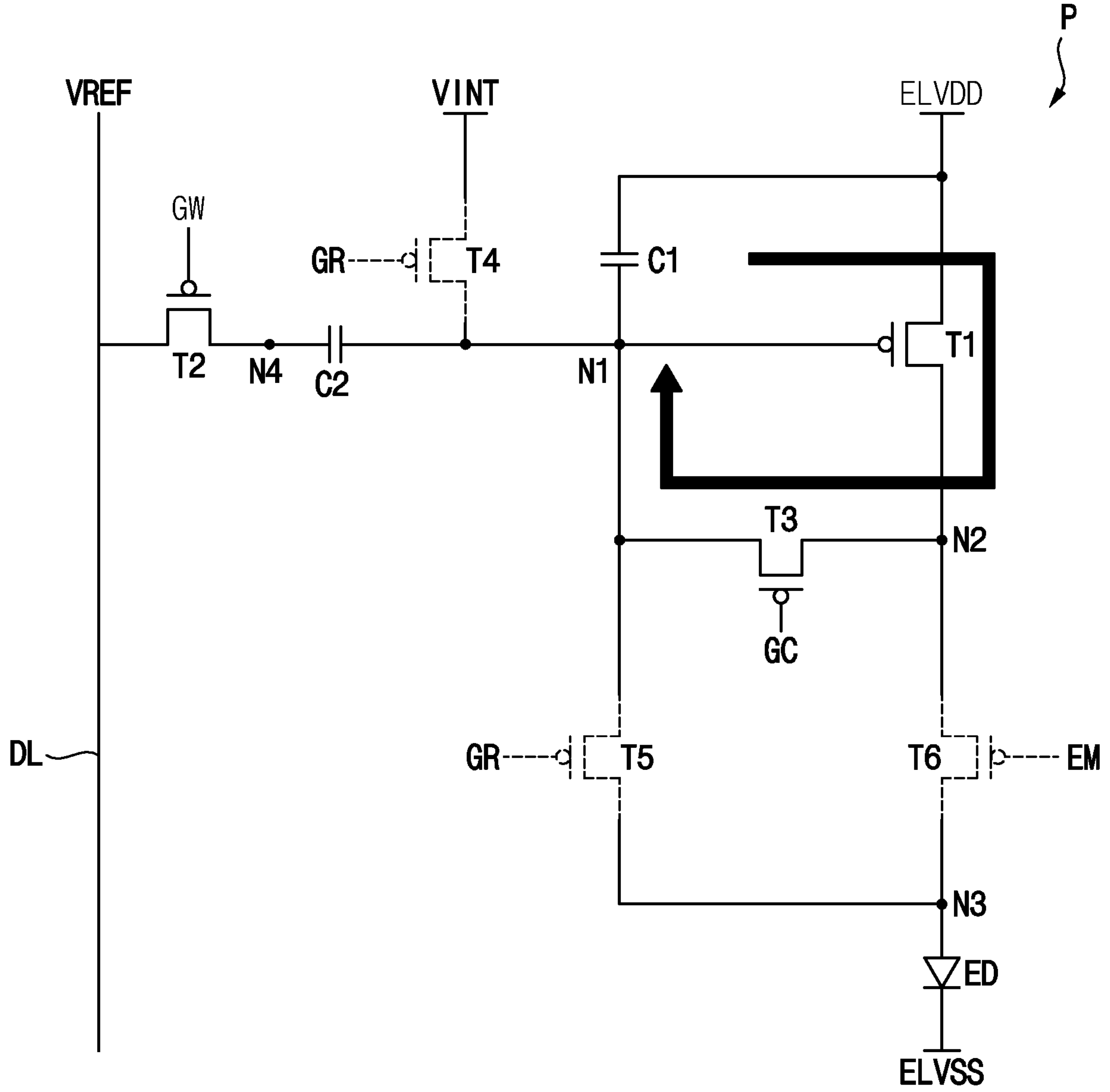
FIG. 5 is a diagram illustrating that the pixel circuit of FIG. 2 performs a threshold voltage compensation operation in a threshold voltage compensation period shown in FIG. 3.
Figure 6A:
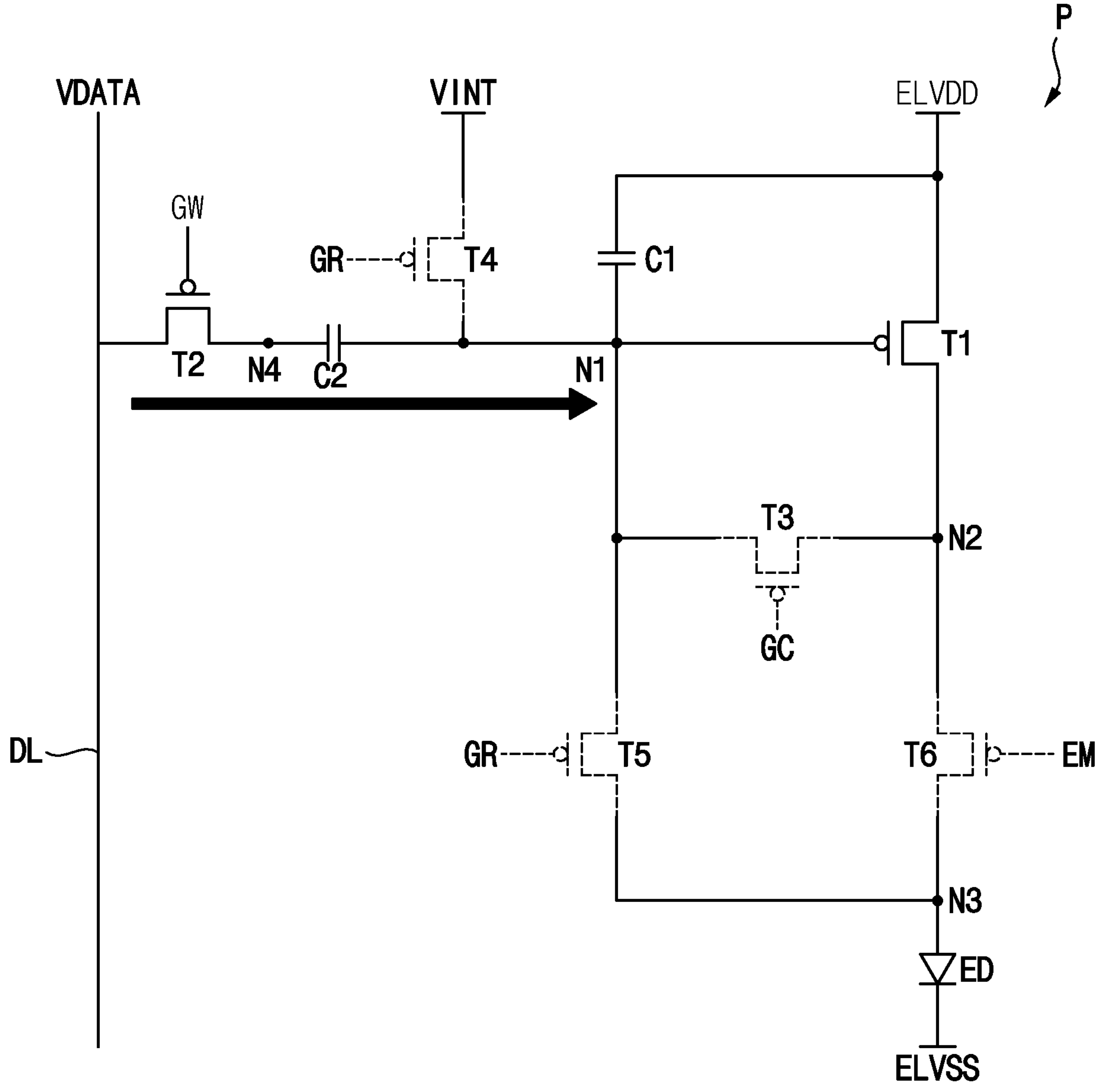
FIGS. 6A and 6B are diagrams illustrating that the pixel circuit of FIG. 2 performs a data writing operation in a data writing period shown in FIG. 3.
Figure 6B:
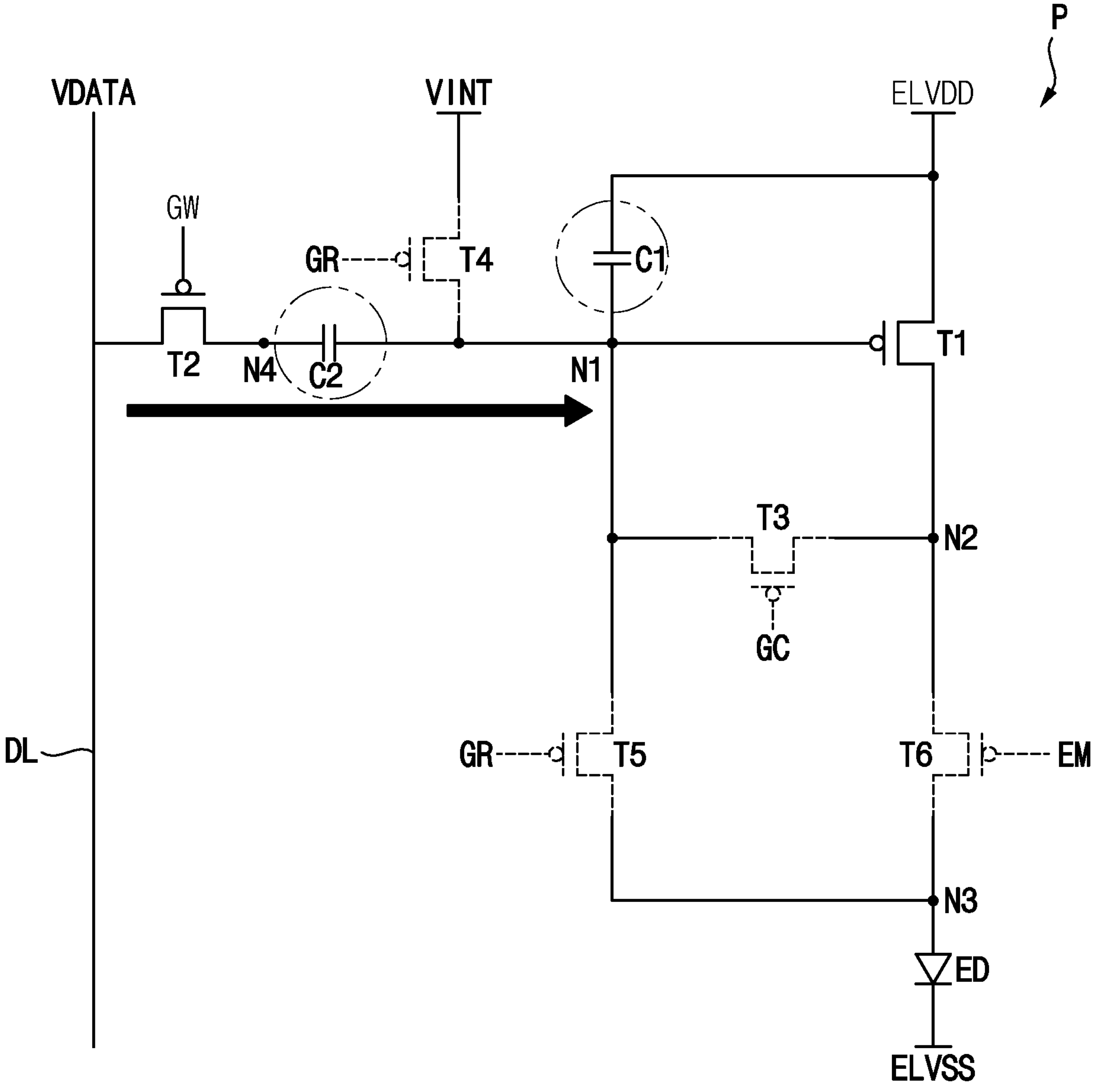
Figure 7:
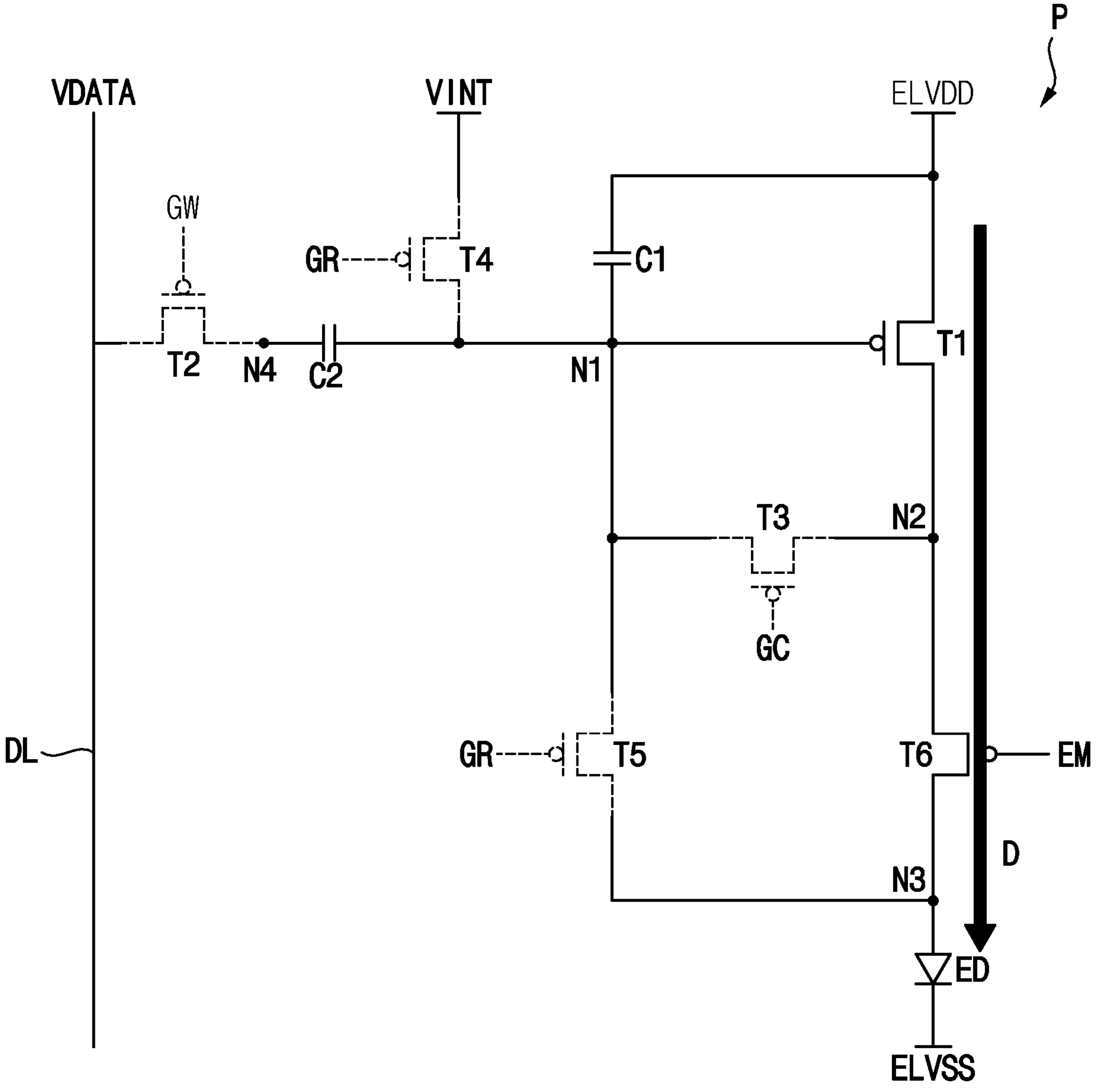
FIG. 7 is a diagram illustrating that the pixel circuit of FIG. 2 performs a light emitting operation in a light emission period shown in FIG. 3.

FIG. 2 is a diagram illustrating a pixel circuit P included in the display device 10 of FIG. 1. FIG. 3 is a waveform diagram illustrating one frame period in which the pixel circuit P of FIG. 2 is driven. FIG. 4 is a diagram illustrating the pixel circuit P of FIG. 2 performing an initialization operation in an initialization period shown in FIG. 3. FIG. 5 is a diagram illustrating the pixel circuit P of FIG. 2 performing a threshold voltage compensation operation in a threshold voltage compensation period shown in FIG. 3. FIGS. 6A and 6B are diagrams illustrating the pixel circuit P of FIG. 2 performing a data writing operation in a data writing period shown in FIG. 3. FIG. 7 is a diagram illustrating the pixel circuit P of FIG. 2 performing a light emitting operation in a light emission period shown in FIG. 3.

Referring to FIGS. 1 to 7, the display panel 100 may include the pixel circuit P and the pixel circuit P may include a light emitting element ED.

The pixel circuit P may receive a first gate signal GW, a second gate signal GC, a third gate signal GR, the data voltage VDATA, and the emission signal EM, and emit light of the light emitting element ED according to level of the data voltage VDATA to display image.

The pixel circuit P may include first to sixth transistors T1 to T6, a first capacitor C1, and a second capacitor C2.

The first transistor T1 may include a gate electrode connected to a first node N1, a first electrode receiving a first power supply voltage ELVDD, and a second electrode connected to a second node N2.

The second transistor T2 may include a gate electrode receiving the first gate signal GW, a first electrode connected to the data line DL, and a second electrode connected to a fourth node N4.

The third transistor T3 may include a gate electrode receiving the second gate signal GC, a first electrode connected to the second node N2, and a second electrode connected to the first node N1.

The fourth transistor T4 may include a gate electrode receiving the third gate signal GR, a first electrode receiving an initialization voltage VINT, and a second electrode connected to the first node N1.

The fifth transistor T5 may include a gate electrode receiving the third gate signal GR, a first electrode connected to the first node N1, and a second electrode connected to a third node N3.

The sixth transistor T6 may include a gate electrode receiving the emission signal EM, a first electrode connected to the second node N2, and a second electrode connected to the third node N3.

For example, the first to sixth transistors T1 to T6 may be P-type transistors. The first electrodes of the first to sixth transistors T1 to T6 may be source electrodes. The second electrodes of the first to sixth transistors T1 to T6 may be drain electrodes. Here, the source electrode and the drain electrode may be referred to interchangeably.

The first capacitor C1 may include a first electrode receiving the first power supply voltage ELVDD and a second electrode connected to the first node N1.

The second capacitor C2 may include a first electrode connected to the fourth node N4 and a second electrode connected to the first node N1.

The light emitting element ED may include an anode electrode connected to the third node N3 and a cathode electrode receiving the second power supply voltage ELVSS.

As shown in FIG. 3, one frame period in which the pixel circuit P is driven may include first to fifth periods DU1 to DU5.

The first period DU1 may be a non-emission period in which the light emitting element ED does not emit light. That is, during the first period DU1, the emission signal EM may have an inactive level. The first period DU1 may include the second to fourth periods DU2 to DU4.

During the second period DU2 (refer to FIGS. 3 and 4), the first gate signal GW and the third gate signal GR may have an active level. During the second period DU2, the second gate signal GC and the emission signal EM may have the inactive level. During the second period DU2, the second transistor T2, the fourth transistor T4, and the fifth transistor T5 may be turned on. A reference voltage VREF may be applied to the data line DL and the second transistor T2 may be turned on in response to the first gate signal GW, so that the reference voltage VREF may be applied to the fourth node N4. The reference voltage VREF may be applied to the fourth node N4 to initialize the fourth node N4. The reference voltage VREF may be lower than the data voltage VDATA. The fourth transistor T4 may be turned on in response to the third gate signal GR, so that the initialization voltage VINT may be applied to the first node N1. The initialization voltage VINT may be applied to the first node N1 to initialize the first node N1. The fourth transistor T4 and the fifth transistor T5 may be turned on in response to the third gate signal GR, so that the initialization voltage VINT may be applied to the third node N3. The initialization voltage VINT may be applied to the third node N3 to initialize the third node N3. As such, the second period DU2 may be an initialization period in which an initialization operation for initializing the fourth node N4, the first node N1, and the third node N3 is performed.

During the third period DU3 (refer to FIGS. 3 and 5), the first gate signal GW and the second gate signal GC may have the active level. During the third period DU3, the third gate signal GR and the emission signal EM may have the inactive level. During the third period DU3, the second transistor T2 and the third transistor T3 may be turned on. When the second transistor T2 is turned on and the second transistor T2 receives the reference voltage VREF from the data line DL, the reference voltage VREF may be applied to the fourth node N4. The third transistor T3 may be turned on in response to the second gate signal GC, so that the third transistor T3 may diode-connect the first transistor T1. When the first transistor T1 is diode-connected, a voltage of the first node N1 may have a value obtained by adding a threshold voltage of the first transistor T1 to the first power supply voltage ELVDD. By diode-connecting the first transistor T1, the threshold voltage of the first transistor T1 may be compensated. As such, the third period DU3 may be a threshold voltage compensation period in which a threshold voltage compensation operation for compensating the threshold voltage of the first transistor T1 is performed.

During the fourth period DU4 (refer to FIGS. 3, 6A and 6B), the first gate signal GW may have the active level. During the fourth period DU4, the second gate signal GC and the third gate signal GR may have the inactive level. During the fourth period DU4, the second transistor T2 may be turned on. The data voltage VDATA may be provided from the data line DL, and the second transistor T2 may be turned on in response to the first gate signal GW so that the data voltage VDATA is applied to the fourth node N4. The second transistor T2 may be turned on in response to the first gate signal GW and a voltage of the fourth node N4 may be changed from the reference voltage VREF to the data voltage VDATA, so that the voltage of the first node N1 may be boosted by a boosting voltage by the first capacitor C1 and the second capacitor C2. The boosting voltage of the first node N1 may be determined by a series connection of the first capacitor C1 and the second capacitor C2. The boosting voltage may be determined by using an [Equation] below:

$$\Delta VN1=\{C\_C2/(C\_C1+C\_C2)\}\times\Delta VN4.$$

Here, ΔVN1 denotes the boosting voltage, C_C1 denotes a capacitance of the first capacitor C1, C_C2 denotes a capacitance of the second capacitor C2, and ΔVN4 denotes a voltage variation of the fourth node N4.

The voltage VN1 of the first node N1 may be boosted by the first capacitor C1 and the second capacitor C2, so that the voltage VN1 of the first node N1 may become sum of the first power supply voltage ELVDD, the threshold voltage of the first transistor T1, and the boosting voltage ΔVN1. As such, the fourth period DU4 may be a data writing period in which a data writing operation for writing the data voltage VDATA to the first node N1 is performed.

During the fifth period DU5 (refer to FIGS. 3 and 7), the emission signal EM may have the active level. During the fifth period DU5, the first gate signal GW, the second gate signal GC, and the third gate signal GR may be have the inactive level. During the fifth period DU5, the sixth transistor T6 may be turned on. When the sixth transistor T6 is turned on, the driving current D of the first transistor T1 may flow to the light emitting element ED. The driving current D of the first transistor T1 may be determined by the voltage VN1 of the first node N1. The light emitting element ED may emit light based on the driving current D of the first transistor T1. As such, the fifth section DU5 may be a light emission period in which a light emitting operation for controlling the light emitting element ED to emit light is performed.

Figure 8:
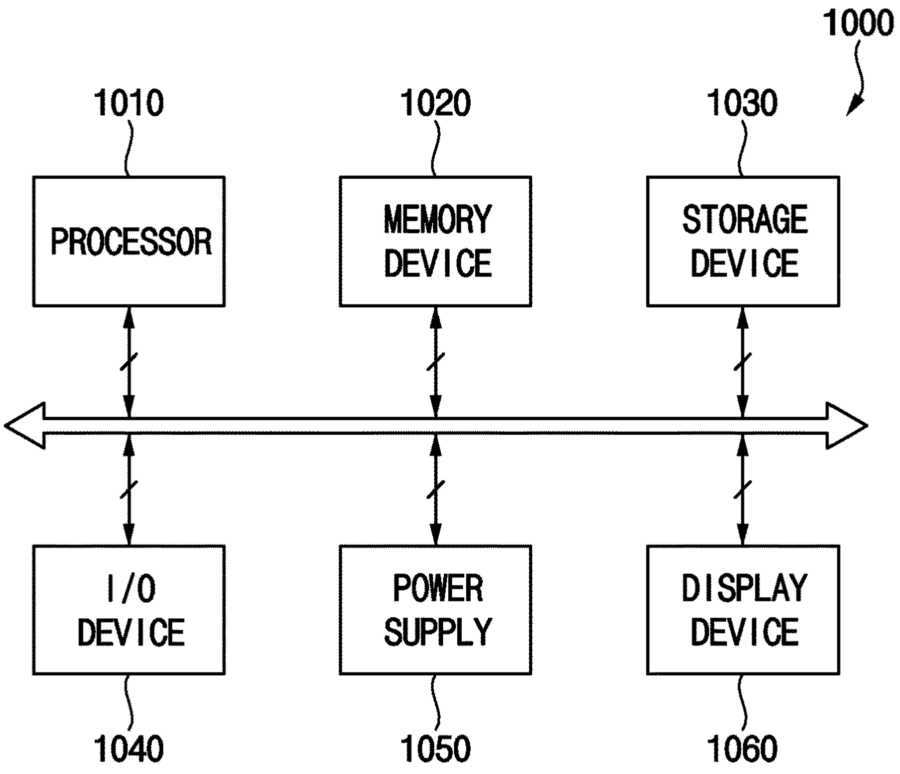
FIG. 8 is a block diagram illustrating an electronic device.
Figure 9:
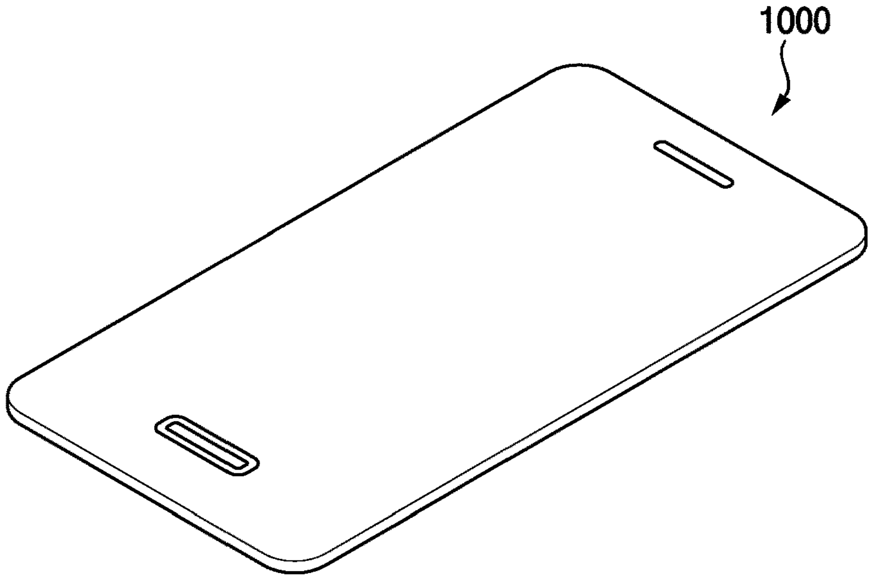
FIG. 9 is a diagram illustrating an embodiment in which the electronic device of FIG. 8 is implemented as a smart phone.

FIG. 8 is a block diagram illustrating an electronic device 1000. FIG. 9 is a diagram illustrating an embodiment in which the electronic device 1000 of FIG. 8 is implemented as a smart phone.

Referring to FIGS. 8 and 9, the electronic device 1000 may include a processor 1010, a memory device 1020, a storage device 1030, an input/output (I/O) device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus (USB) device, other electronic device, and the like.

In an embodiment, as illustrated in FIG. 9, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a micro processor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The inventive concepts may be applied to any display device and any electronic device including the touch panel. For example, the inventive concepts may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of the inventive concept and is not to be construed as limiting thereof. Although embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. A pixel circuit, comprising:

a first transistor including a gate electrode connected to a first node, a first electrode which receives a first power supply voltage, and a second electrode connected to a second node;

a second transistor including a gate electrode which receives a first gate signal, a first electrode connected to a data line, and a second electrode connected to a fourth node;

a third transistor including a gate electrode which receives a second gate signal, a first electrode connected to the second node, and a second electrode connected to the first node;

a fourth transistor including a gate electrode which receives a third gate signal, a first electrode which receives an initialization voltage, and a second electrode connected to the first node;

a fifth transistor including a gate electrode which receives the third gate signal, a first electrode connected to the first node, and a second electrode connected to a third node;

a sixth transistor including a gate electrode which receives an emission signal, a first electrode connected to the second node, and a second electrode connected to the third node;

a first capacitor including a first electrode which receives the first power supply voltage and a second electrode connected to the first node;

a second capacitor including a first electrode connected to the fourth node and a second electrode connected to the first node; and a light emitting element including an anode electrode connected to the third node and a cathode electrode which receives a second power supply voltage.

2. The pixel circuit of claim 1, wherein a frame period in which the pixel circuit is driven includes an initialization period, a threshold voltage compensation period, a data writing period, and a light emission period, wherein, during the initialization period, an initialization operation for initializing the fourth node, the first node, and the third node is performed, wherein, during the threshold voltage compensation period, a threshold voltage compensating operation for compensating for a threshold voltage of the first transistor is performed, wherein, during the data writing period, a data writing operation for writing a data voltage to the first node is performed, and wherein, during the light emission period, a light emitting operation for controlling the light emitting element to emit light is performed.

3. The pixel circuit of claim 2, wherein, during the initialization period, the fourth transistor and the fifth transistor are turned on in response to the third gate signal such that the initialization voltage is applied to the first node and the third node.

4. The pixel circuit of claim 2, wherein, during the initialization period, a reference voltage is applied to the data line and the second transistor is turned on in response to the first gate signal such that the reference voltage is applied to the fourth node.

5. The pixel circuit of claim 2, wherein, during the threshold voltage compensation period, the third transistor is turned on in response to the second gate signal such that the third transistor diode-connects the first transistor.

6. The pixel circuit of claim 5, wherein, when the first transistor is diode-connected, a voltage of the first node has a value obtained by adding a threshold voltage of the first transistor to the first power supply voltage.

7. The pixel circuit of claim 2, wherein, during the data writing period, the data voltage is applied to the data line and the second transistor is turned on in response to the first gate signal such that the data voltage is applied to the fourth node.

8. The pixel circuit of claim 7, wherein, during the data writing period, the second transistor is turned on in response to the first gate signal and a voltage of the fourth node is changed from a reference voltage to the data voltage, such that a voltage of the first node is boosted by a boosting voltage by the first capacitor and the second capacitor.

9. The pixel circuit of claim 8, wherein the boosting voltage is determined by using an [Equation] below:

$$\Delta VN1=\{C\_C2/(C\_C1+C\_C2)\}\times\Delta VN4,$$

where ΔVN1 denotes the boosting voltage, C_C1 denotes a capacitance of the first capacitor, C_C2 denotes a capacitance of the second capacitor, and ΔVN4 denotes a voltage variation of the fourth node.

10. The pixel circuit of claim 2, wherein, during the light emission period, the sixth transistor is turned on in response to the emission signal such that the light emitting element emits light based on a driving current of the first transistor.

11. A display device, comprising:

a display panel including a pixel circuit; and a display panel driver configured to drive the display panel, wherein the pixel circuit include:

a first transistor including a gate electrode connected to a first node, a first electrode which receives a first power supply voltage, and a second electrode connected to a second node;

a second transistor including a gate electrode which receives a first gate signal, a first electrode connected to a data line, and a second electrode connected to a fourth node;

a third transistor including a gate electrode which receives a second gate signal, a first electrode connected to the second node, and a second electrode connected to the first node;

a fourth transistor including a gate electrode which receives a third gate signal, a first electrode which receives an initialization voltage, and a second electrode connected to the first node;

a fifth transistor including a gate electrode receiving the third gate signal, a first electrode connected to the first node, and a second electrode connected to a third node;

a sixth transistor including a gate electrode which receives an emission signal, a first electrode connected to the second node, and a second electrode connected to the third node;

a first capacitor including a first electrode which receives the first power supply voltage and a second electrode connected to the first node;

a second capacitor including a first electrode connected to the fourth node and a second electrode connected to the first node; and a light emitting element including an anode electrode connected to the third node and a cathode electrode which receives a second power supply voltage.

12. The display device of claim 11, wherein a frame period in which the pixel circuit is driven includes an initialization period, a threshold voltage compensation period, a data writing period, and an light emission period, wherein, during the initialization period, an initialization operation for initializing the fourth node, the first node, and the third node is performed, wherein, during the threshold voltage compensation period, a threshold voltage compensating operation for compensating a threshold voltage of the first transistor is performed, wherein, during the data writing period, a data writing operation for writing a data voltage to the first node is performed, and wherein, during the light emission period, a light emitting operation for controlling the light emitting element to emit light is performed.

13. The display device of claim 12, wherein, during the initialization period, the fourth transistor and the fifth transistor are turned on in response to the third gate signal such that the initialization voltage is applied to the first node and the third node.

14. The display device of claim 12, wherein, during the initialization period, a reference voltage is applied to the data line and the second transistor is turned on in response to the first gate signal such that the reference voltage is applied to the fourth node.

15. The display device of claim 12, wherein, during the threshold voltage compensation period, the third transistor is turned on in response to the second gate signal such that the third transistor diode-connects the first transistor.

16. The display device of claim 15, wherein, when the first transistor is diode-connected, a voltage of the first node has a value obtained by adding a threshold voltage of the first transistor to the first power supply voltage.

17. The display device of claim 12, wherein, during the data writing period, the data voltage is applied to the data line and the second transistor is turned on in response to the first gate signal such that the data voltage is applied to the fourth node.

18. The display device of claim 17, wherein, during the data writing period, the second transistor is turned on in response to the first gate signal and a voltage of the fourth node is changed from a reference voltage to the data voltage, such that a voltage of the first node is boosted by a boosting voltage by the first capacitor and the second capacitor.

19. The display device of claim 18, wherein the boosting voltage is determined by using an [Equation] below:

$$\Delta VN1=\{C\_C2/(C\_C1+C\_C2)\}\times\Delta VN4,$$

where ΔVN1 denotes the boosting voltage, C_C1 denotes a capacitance of the first capacitor, C_C2 denotes a capacitance of the second capacitor, and ΔVN4 denotes a voltage variation of the fourth node.

20. The display device of claim 12, wherein, during the light emission period, the sixth transistor is turned on in response to the emission signal such that the light emitting element emits light based on a driving current of the first transistor.

* * * * *